Patented July 13, 1926.

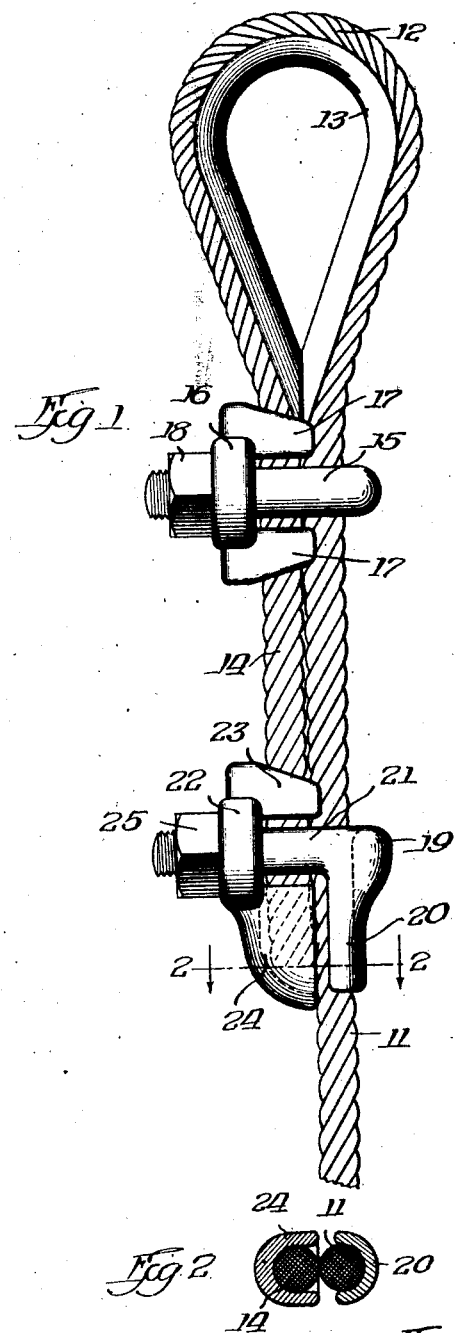

1,592,615

UNITED STATES PATENT OFFICE.

ERNEST J. NEVEAU, OF PROCTOR, MINNESOTA.

WIRE-ROPE CLAMP.

Application filed June 29, 1925. Serial No. 40,272.

This invention relates to a new and improved clamp for wire ropes or steel cables, or the like, and more particularly, to a clamp of this character adapted to enclose the ends of the wires.

In a great many uses of wire cables for guys and for slings in handling material, an end of the cable is secured by passing it through or around the member to which it is secured and clamping the end of the cable against an intermediate portion of the cable. This is commonly done by means of U shaped clamps which leave the end of the cable exposed. The wires at the end of the cable tend to fray or spread and are thus a source of danger and possible injury to the men working with or around the cables.

It is an object of the present invention to provide a new and improved cable clamp adapted to house a cable end.

It is an additional object to provide a device of this character which is simple in design and construction and adapted for commercial production.

Other and further objects will appear as the description proceeds.

I have illustrated a preferred embodiment of my invention in the accompanying drawing, in which—

Figure 1 is an elevation of the clamp in use, and

Figure 2 is a section taken on line 2—2 of Figure 1.

The cable or wire rope 11 has a bight 12 looped around an eye or hondo 13 with the end portion 14 of the cable brought back parallel to the main body of the cable 11. The two parts of the cable are clamped together adjacent the hondo by means of a clamp comprising a U member 15, a body member 16 having the enclosing legs 17, and the securing nuts 18.

The end of the rope is clamped to the body of the rope by means of a clamp comprising the member 19 having a rope engaging extension 20 and the arms 21 extending through the housing member 22. The housing member 22 is provided with the legs 23 extending upon either side of the ropes or cables, and with the cup shaped portion 24 housing the end of the cable. The arms 21 of the member 19 are secured in place in the housing member 22 by means of the nut 25.

By the use of the construction shown the end and body of the cable are firmly clamped together and in addition the end of the cable is housed and fraying is prevented. There are no frayed ends to cause injury to men working with the cable. The extended portion 20 of the member 19 is opposed to the housing member and insures the end of the cable being maintained within the housing even if the cable is flexed adjacent the clamp. The clamp is adapted for rapid and easy removal from the cable when desired and may be readily installed without special tools.

I claim:

1. A rope clamp or the like, comprising a housing member having a portion adapted to enclose a cable end and legs straddling the cable, a clamping member having legs passing through the housing member between the housing member legs and enclosing portion, and nuts to retain the parts together.

2. A rope clamp or the like, comprising a housing member having a portion adapted to enclose a cable end and legs straddling the cable, a clamping member having a portion extending opposite the housing portion of the housing member to retain a cable against said portion, and having legs passing through the housing member between the housing member legs and enclosing portion, and nuts to retain the parts together.

Signed at Proctor, Minnesota, this 17th day of June, 1925.

ERNEST J. NEVEAU.